US012777226B2

(12) United States Patent
Rishabh et al.

(10) Patent No.: US 12,777,226 B2
(45) Date of Patent: Oct. 27, 2026

(54) RESOURCE-EFFICIENT DELIVERY OF RELEVANT CONTENT

(71) Applicant: Google LLC, Mountain View, CA (US)

(72) Inventors: Kumar Rishabh, Redmond, WA (US); Wei Huang, Kirkland, WA (US); Zhenyu Liu, San Jose, CA (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 18/683,331

(22) PCT Filed: Mar. 13, 2023

(86) PCT No.: PCT/US2023/015069
§ 371 (c)(1),
(2) Date: Feb. 13, 2024

(87) PCT Pub. No.: WO2024/191409
PCT Pub. Date: Sep. 19, 2024

(65) Prior Publication Data
US 2025/0274636 A1 Aug. 28, 2025

(51) Int. Cl.
*H04N 21/466* (2011.01)
*H04N 21/25* (2011.01)
*H04N 21/442* (2011.01)

(52) U.S. Cl.
CPC ......... *H04N 21/466* (2013.01); *H04N 21/252* (2013.01); *H04N 21/44204* (2013.01)

(58) Field of Classification Search
CPC ............... H04N 21/466; H04N 21/252; H04N 21/44204; H04N 21/25891; H04N 21/8456
See application file for complete search history.

(56) References Cited

U.S. PATENT DOCUMENTS 5,157,511 A 10/1992 Kawai et al.
5,233,485 A 8/1993 Yang
(Continued)

OTHER PUBLICATIONS

International Preliminary Report on Patentability in International Appln. No. PCT/US2023/015069, mailed on Sep. 25, 2025, 9 pages.
(Continued)

*Primary Examiner* — Nathan J Flynn
*Assistant Examiner* — Christine A Kurien
(74) *Attorney, Agent, or Firm* — Fish & Richardson P.C.

(57) ABSTRACT

Methods, systems, and apparatus, including medium-encoded computer program products, for resource-efficient delivery of relevant content are described. User segments for a video can be identified based on user segments assigned to users that previously watched the video and a measure of users that have been assigned the user segment. For each user segment, a level of semantic similarity between the corresponding topic for the user segment and content of the video can be determined. A filtered set of user segments for the video can be generated by filtering user segments based on the level of semantic similarity. An expanded set of user segments for the video can be generated by adding additional user segments based on levels of semantic similarity between the additional user segments and the content of the video. Digital components are distributed to client devices based on the topics corresponding to the expanded set of user segments.

20 Claims, 4 Drawing Sheets

(56) References Cited

U.S. PATENT DOCUMENTS

| | | | | |
|---|---|---|---|---|
| 6,360,234 | B2 | 3/2002 | Jain et al. | |
| 7,110,664 | B2 | 9/2006 | Yogeshwar et al. | |
| 7,383,260 | B2 | 6/2008 | Smith et al. | |
| 7,487,072 | B2 | 2/2009 | Semple et al. | |
| 7,559,017 | B2 | 7/2009 | Datar et al. | |
| 7,873,642 | B2 | 1/2011 | Smith et al. | |
| 8,452,778 | B1 | 5/2013 | Song et al. | |
| 9,338,520 | B2 | 5/2016 | Girouard et al. | |
| 9,420,287 | B2 | 8/2016 | Ahsan et al. | |
| 9,502,075 | B2 | 11/2016 | Yogeshwar et al. | |
| 10,003,781 | B2 | 6/2018 | Kulas | |
| 10,643,249 | B2 | 5/2020 | Tran et al. | |
| 2005/0033758 | A1 | 2/2005 | Baxter | |
| 2007/0130015 | A1 * | 6/2007 | Starr | H04N 21/858<br>705/14.46 |
| 2007/0255755 | A1 | 11/2007 | Zhang et al. | |
| 2008/0092182 | A1 * | 4/2008 | Conant | H04N 21/2543<br>348/E7.071 |
| 2012/0227063 | A1 * | 9/2012 | Tsurumi | H04N 21/84<br>725/10 |
| 2018/0192138 | A1 * | 7/2018 | Gandhi | H04N 21/466 |

OTHER PUBLICATIONS

International Search Report and Written Opinion in International Appln. No. PCT/US2023/015069, mailed on Sep. 5, 2023, 14 pages.

* cited by examiner

RESOURCE-EFFICIENT DELIVERY OF RELEVANT CONTENT

CROSS-REFERENCE TO RELATED APPLICATION

This application is a National Stage Application under 35 U.S.C. § 371 and claims the benefit of International Application No. PCT/US2023/015069, filed Mar. 13, 2023, the entire contents of which are incorporated herein by reference for all purposes.

TECHNICAL FIELD

This specification relates to data processing and digital content distribution.

BACKGROUND

Content delivery can include providing text-based files, multimedia and other content-types from server systems to client devices. In some cases, a user requests a particular piece of content, such as the homepage for a web site, and in other cases, content is selected by the server system and provided to the client device. Content selected by a server system can also be delivered to supplement specific content requested by a user.

In addition, data security and user privacy is vital in systems and devices connected to public networks, such as the Internet. The enhancement of user privacy has led many developers to change the ways in which user data is handled. For example, some browsers are planning to deprecate the use of third-party cookies.

SUMMARY

This specification relates to analyzing content elements for semantic similarity, and using the analysis to select and provide relevant content to users in ways that preserve and enhance user data privacy. The techniques can include evaluating user interest segments and video content using collaborative and semantic filtering and assigning, to videos or groups of videos (e.g., channels), user interest segments that satisfy quality assurance conditions. The assignments can then be used to distribute content that is relevant to users that watch the videos without using information identifying the user or any other user specific information.

Providing relevant content that is consumed limits the strain on computing resources, including server and network, by reducing the need to respond to additional requests from users who did not receive relevant content in response to an initial request. This reduction also results in energy savings by reducing the need to add servers, whose operation can consume large amounts of power. In general, one innovative aspect of the subject matter described in this specification can be embodied in methods including the operations of identifying a set of user segments for a video based on user segments assigned to a set of users that previously watched the video and, for each user segment, a measure of users in the set of users that have been assigned the user segment; determining, for each user segment, a level of semantic similarity between the corresponding topic for the user segment and content of the video; generating a filtered set of user segments for the video by filtering, from the set of user segments, one or more user segments based on the level of semantic similarity for each user segment; generating an expanded set of user segments for the video by adding one or more additional user segments based on respective levels of semantic similarity between the additional user segments and the content of the video; and distributing digital components to client devices for display with the video based at least in part on the topics corresponding to the expanded set of user segments. Other implementations of this aspect include corresponding apparatus, systems, and computer programs, configured to perform the aspects of the methods, encoded on computer storage devices.

One or more of the following features can be included. Identifying the set of user segments for a video can include applying collaborative filtering to topics of interest of the set of users and topics of interest of the set of similar users to identify the corresponding topics of the set of user segments. Filtering, from the set of user segments, one or more user segments based on the level of semantic similarity for each user segment can include comparing, for each user segment, the level of semantic similarity for the user segment to a threshold, and filtering, from the set of user segments, each user segment for which the level of semantic similarity is less than a threshold. A priority can be assigned to each user segment, and distributing digital components to client devices for display with the video based at least in part on the topics corresponding to the expanded set of user segments can include selecting digital components for distribution to the client devices based on the priority assigned to each user group. The priority of each of the one or more user segments assigned to a video channel can be lower than each other user segment in the expanded set of user segments. Generating the filtered set of user segments for the video can include filtering, from the set of user segments, one or more user segments based on one or more quality metrics assigned to each user segment. The one or more quality metrics can include at least one of lift or precision. It can be determined that a number of user segments in the expanded set of user segments is less than a threshold. In response to determining that the number of user segments in the expanded set of user segments is less than a threshold, one or more user segments assigned to a video channel that includes the video can be identified. At least one of the one or more user segments assigned to a video channel that includes the video can be added to the expanded set of user segments.

Particular embodiments of the subject matter described in this specification can be implemented so as to realize one or more of the following advantages. A combination of several techniques including collaborative filtering, semantic filtering, quality assurance filtering and interest-based group expansion to assign user interest segments to videos or channels that include multiple videos enables the distribution and/or display of content that is relevant to users that watch the videos without knowing who the users are or receiving any identifying information about the users. The provision of relevant content enhances users' online experiences while reducing the amount of wasted computing and network resources used to provide irrelevant content that the users will ignore. The combination of techniques provides the synergistic effect of providing such relevant content in ways that enhance user privacy, e.g., by not requiring the transmission of user identifying information or third-party cookies from client devices to online platforms that select and distribute the content.

Historically, third-party cookies (e.g., cookies from a different domain than the resource being rendered by a client device) have been used to collect data from client devices across the Internet. However, some browsers and device platforms block the use of third-party cookies and third-party cookies are increasingly being removed from use, thereby preventing the collection of data using third party cookies. This creates a challenge when attempting to utilize collected data to make inferences, segment data, or otherwise utilize data to enhance online browsing experiences, e.g., by selecting content relevant to users based on the data collected using third party cookies. In other words, without the use of third-party cookies, much of the data previously collected is no longer available, which prevents computing systems from being able to use that data to predict interests or attributes of users based on activities performed by the users at particular web pages or other resources, to enhance the online experience for users, and/or to provide relevant content to users.

The techniques described herein can solve hurdles that may arise from the eradication of third-party cookies. For example, the techniques described in this document evaluate historical data related to viewers of videos and their assigned user segments to assign user segments to videos such that these assigned segments are used to select relevant content for users that watch the videos without receiving data identifying the users. The described collaborative filtering, semantic filtering, and quality assurance filtering techniques ensure that the user segments are of high quality and result in relevant content being provided with the videos.

By pre-assigning user segments to videos, content such as digital components can be selected faster than techniques that analyze user information and/or other signals at request time. For example, the pre-assigned user segments can be mapped to particular digital components to accelerate the selection of digital components for display with videos. Delays in providing content, e.g., digital components, in response to requests can result in page load errors at the client devices or cause portions of an electronic resource to remain unpopulated even after other portions of the electronic resource are display at the client devices. Also, as the delay in providing the digital component to the client device increases, it is more likely that the electronic resource will no longer be active at the client device when the digital component is delivered to the client device, thereby negatively impacting a user's experience with the electronic resource. Further, delays in providing the digital component can result in a failed delivery of the digital component, for example, if the electronic resource is no longer active at the client device when the digital component is provided. This could necessitate the reserving of more resources at the client device such as memory space, processor time, and/or other software resources to successfully provide the digital component to a user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

With the vast amounts of data available to users, it is increasingly important to determine content that is relevant to users as delivery of irrelevant or unwanted content needlessly expends computing resources, including the server resources needed to load and transmit the content, and the network resources that deliver the content. When the content includes multimedia files, which can be large, the magnitude of wasted resources increases. For example, if a user is interested in a video relating to the repair of an appliance, and the user is provided information relating to the repair of an appliance from a manufacturer other than the one that provided the user's appliance, the user will likely discard the video and request an additional video. In such cases, the additional request and its resource overhead as well as server resources, including the energy required to respond, and those that were used to provide the first video were largely wasted. For such reasons, resource efficiency benefits result when content is properly curated.

However, in addition to resource-efficiency, it is beneficial to maintain user privacy. Therefore, curation should be limited to characteristics that do not identify any particular individual. For example, while it is acceptable to curate based on coarse characteristics, such as users in a large region (e.g., Los Angeles), use of identifying characteristics should be avoided.

To effectively curate content, while preserving user privacy, the techniques of this specification determine interest-based user segments for videos, and use those interest-based user segments to identify content of interest. For brevity, interest-based user segments are also referred to as user segments in this document. To maintain user privacy, user segments can be based on coarse characteristics, as described further below. In general, this document describes systems and techniques for evaluating user segments and video content using collaborative and semantic filtering and assigning, to videos, user segments that satisfy quality assurance conditions. The assignments can then be used to distribute digital content that is relevant to users that watch the videos.

Figure 1:
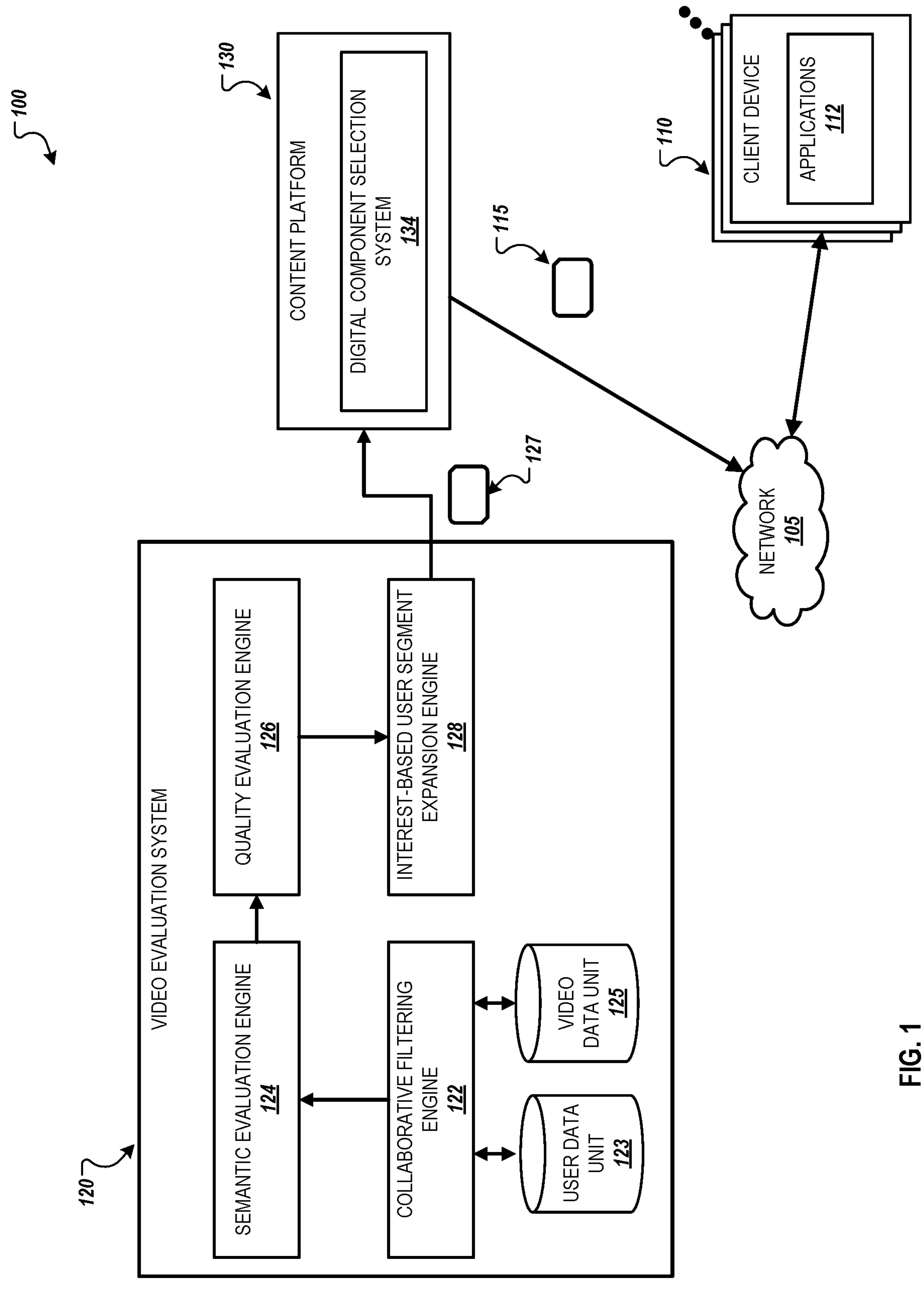
FIG. 1 is a block diagram of an example environment in which user segments are assigned to videos and used to distribute digital components for display with the videos.

FIG. 1 is a block diagram of an example environment 100 in which user segments are assigned to videos and used to distribute digital components for display with the videos. The environment 100 includes a video evaluation system 120, client devices 110, a content platform 130 and a data communication network 105, such as a local area network (LAN), a wide area network (WAN), the Internet, a mobile network, or a combination thereof. The data communication network 105 connects client devices 110 to the video evaluation system 120 and to the content platform 130. Although not shown in FIG. 1, the network 105 can also connect the content platform 130 with a video evaluation system 120.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually display information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110. A client device 110 can include many different types of applications.

The applications 112 can present, e.g., display, electronic resources, e.g., web pages, application pages, or other application content, to a user of the client device 110. The electronic resources can include digital component slots for displaying digital components 115 with the content of the electronic resources. A digital component slot is an area of an electronic resource (e.g., web page or application page) for displaying a digital component 115. A digital component slot can also refer to a portion of an audio and/or video stream (which is another example of an electronic resource) for playing a digital component 115.

An electronic resource is also referred to herein as a resource for brevity. For the purposes of this document, a resource can refer to a web page, application page, application content presented by a native application, electronic document, audio stream, video stream, or other appropriate type of electronic resource with which a digital component 115 can be displayed.

As used throughout this document, the phrase "digital component" refers to a discrete unit of digital content or digital information (e.g., a video clip, audio clip, multimedia clip, image, text, or another unit of content). A digital component 115 can electronically be stored in a physical memory device as a single file or in a collection of files, and digital components 115 can take the form of video files, audio files, multimedia files, image files, or text files and include advertising information, such that an advertisement is a type of digital component 115. For example, the digital component 115 may be content that is intended to supplement content of a web page or other resource presented by the application 112. More specifically, the digital component 115 may include digital content that is relevant to the resource content (e.g., the digital component 115 may relate to the same topic as the web page content, or to a related topic). The provision of digital components 115 can thus supplement, and generally enhance, the web page or application content.

When the application 112 loads a resource that includes a digital component slot, the application 112 can generate a digital component request that requests a digital component for display in the digital component slot. In some implementations, the digital component slot and/or the resource can include code (e.g., scripts) that cause the application 112 to request a digital component. The application 112 can send the digital component request to the content platform 130.

A digital component request sent by the application 112 can include contextual data. The contextual data can describe the environment in which a selected digital component will be displayed. The contextual data can include, for example, a resource locator for a resource (e.g., website or native application) with which the selected digital component will be displayed, coarse location information indicating a general location of the client device 110 that sent the digital component request (e.g., the country or state in which the client device 110 is located), a type of the client device 110 (e.g., laptop computer, smartphone, gaming device, etc.), a spoken language setting of the application 112 or client device 110, the number of digital component slots in which digital components will be displayed with the resource, the types of digital component slots, and other appropriate contextual information. The resource locator can be in the form of a Universal Resource Locator (URL), a Uniform Resource Identifier (URI), network address, domain name, or other appropriate resource locator.

Some applications 112 can include a video player for streaming or otherwise playing videos requested from the content platform 130 or another video source. When the application 112 sends a digital component request for a digital component to display with a video, e.g., in a break in the video or adjacent to the video player, the application 112 can include, e.g., in the contextual data, data identifying the video. The data identifying the video can include a unique identifier for the video, the title of the video, a resource locator for a resource from which the video is streamed or downloaded, and/or other appropriate information for identifying a video, The digital component request may not include data that can be used to identify the user. For example, the digital component request may not include a cookie (e.g., a third-party cookie), user identifier, IP address, or other identifying information.

The content platform 130, which can be implemented as one or more computers in one or more locations, is configured to distribute digital components to client devices 110, e.g., in response to digital component requests received from the client devices 110. The content platform 130 includes a digital component selection system 134, which can be implemented as one or more computers in one or more locations.

The digital component selection system 134 is configured to select digital components for distribution to client devices 110, e.g., based on the contextual data included in the digital component request. For example, the digital component selection system 134 can select one or more digital components to display with a video being viewed by a user based on the video itself. In a particular example, the digital component selection system 134 can select a digital component based on the topic of the video, a topic of the channel that includes the video, and/or other appropriate information.

The digital component selection system 134 can also be configured to select a digital component for a video based on user segments assigned to the video and/or user segments assigned to a channel (or other video group) that includes the video. In general, a user segment can include a group or audience of users that have been determined to be interested in a particular topic. Each user segment can have a corresponding topic and the users assigned to a user segment can be users that are determined to be interested in the topic. Example topics can include topics of interest (e.g., cats, books, travel, etc.) or brands that represent long term interests of users, such as outdoors enthusiast, sports fan, gardener, etc.

As described in more detail below, the video evaluation system 120 is configured to assign user segments to videos and/or channels. The digital component selection system 134 can use the assignments to select digital components for display with videos. In some implementations, digital component providers that want their digital components to be displayed with videos related to particular topics or to users that are interested in particular topics can assign the topics to the digital components as distribution criteria. The video evaluation system 120 can include collaborative filtering engine 122, a semantic evaluation engine 124, a quality evaluation engine 126, and an interest-based segment expansion engine 128.

In general, distribution criteria for a digital component defines the situations in which the digital component is eligible or not eligible for distribution to a client device 110 of a user. The distribution criteria for a digital component can include topics for which the digital component is eligible for distribution and/or topics for which the digital component is not eligible for distribution. If a digital component request includes data identifying a video that has been assigned a user segment with one of the eligible topics, the digital component is eligible for selection and display with the video. If a digital component request includes data identifying a video that has been assigned a user segment with one of the non-eligible topics, the digital component is not eligible for selection or display with the video.

For example, the distribution criteria for a digital component with content related to an event in Hawaii can include, as eligible topics, "Hawaii," and "travel to Hawaii." If a request for a digital component to display with a video that has been assigned a user segment having the topic "Hawaii," the digital component for the event in Hawaii would be eligible for selection and distribution to the client device 110 from which the digital component request was received.

The digital component selection system 134 can use other information to select digital components, such as other contextual data included in the digital component request (and corresponding distribution criteria of the digital components) and selection parameters for the digital components. A selection parameter can specify an amount that a digital component provider is willing to provide to a publisher (e.g., the publisher of the video) in exchange for displaying the digital component with the video.

The video evaluation system 120 evaluates user segments and videos and assigns user segments and their corresponding topics to videos based on the evaluation. The video evaluation system 120 can be implemented as one or more computers in one or more locations. In general, the video evaluation system 120 includes several stages of evaluation to identify, for each video, user segments that have topics that (i) are of interest to users that have viewed the video, (ii) are semantically related to content of the video, and (iii) whose association with the video is of high quality. The video evaluation system 120 can further assign user segments to videos based on similarities among user segments.

The collaborative filtering engine 122 is configured to identify a set of user segments for videos based on videos viewed by users and the user segments assigned to the users that viewed the videos. The collaborative filtering engine 122 can identify the user segments for the videos based on user data stored in a user data storage unit 123 and video data stored in a video data storage unit 125. The data storage units 123 and 125 can include databases, tables, or other appropriate data structures for storing data. Each user segment can have a unique segment identifier (ID) and each video can have a unique video ID.

The user data can include, for each user in a set of users, data identifying videos viewed by the user and user segments to which the user has been assigned. In general, a user can be assigned to a user segment based on their user profile (which may include their confirmed interests), topics of videos that the user viewed, other online activity (e.g., queries submitted to a video platform), and/or other appropriate data. The video data can include, for each video in a set of videos, data identifying the title of the video, a publisher of the video, a channel that includes the video, one or more topics of content of the video, and/or any user segments already assigned to the video.

The user data storage unit 123 can include user data for users that have opted in to such data collection and that are signed into to a publisher's site or application, e.g., users that are signed into a video platform that streams or otherwise provides videos to client devices 110 for display to users of the client devices 110. For example, a publisher can store the user data for users that have agreed to the collection and use of their data. The users for which user data is collected and stored can be a subset of the total number of unique users that may request videos from the publisher and/or from which digital component requests may be received.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The collaborative filtering engine 122 can identify the set of user segments for each video using collaborative filtering techniques. In general, these collaborative filtering techniques include identifying user segments for a video based on the user segments of the users that have previously watched the video. For example, if many of the users that watch a video about racing have been assigned to a "car enthusiast" user segment, the collaborative filtering engine 122 can assign the "car enthusiast" user segment to the video.

The collaborative filtering engine 122 can aggregate the user data and the video data and perform the collaborative filtering techniques using the aggregated data. For each video, the collaborative filtering engine 122 can determine a segment view score for each user segment or for at least some of the user segments. The segment view score for a video and a user segment can be based on a number of unique users assigned to the user segment that viewed the video relative to a total number of unique users that viewed the video. For example, the segment view score for a video and user segment can be computed using Equation (1):

$$\text{Segment view score} = \frac{\text{Count (video } ID\text{, segment } ID\text{)}}{\text{Count (video } ID\text{)}} \tag{1}$$

In Equation (1), Count (video ID, segment ID) represents a count of the number of unique users assigned to the user segment with a particular segment ID that viewed a video with a particular video ID, and Count (video ID) represents a count a total number of unique users that viewed the video with the particular video ID. Thus, in this example, the segment view score is equal to the number of unique users assigned to the user segment that viewed the video divided by the total number of unique users that viewed the video. This quotient can be multiplied by another factor to obtain the segment view score such that the segment view score is directly proportional to the number of unique users assigned to the user segment that viewed the video divided by the total number of unique users that viewed the video. These example segment view scores for a user segment have higher values when a larger number of the users that watched the video are assigned to the user segment. The segment view scores for the user segments and for a given video computed in this way are normalized scores among all user segments to capture the conditional probability of crossed key (e.g., video ID, segment ID) given the primary key (video ID).

In some implementations, the segment view score for a video can be based on a segment measure that is based on a number of users assigned to the user segment relative to the total number of known users, e.g., a ratio between these two numbers. The total number of known users can include all users that may request a video, including those that have not opted into data collection. The segment view score can be computed using Equation (2):

$$\text{Segment measure} = \frac{\text{Count (segment } ID\text{)}}{\text{Total count}} \tag{2}$$

In Equation 2, Count (segment ID) represents a count of the number of unique users that have been assigned to the user segment with a particular segment ID and Total count represents the total number of known users.

The segment view score for a user segment and a video can be computed based on the segment measure for the user segment using Equation 3:

$$\text{Segment view score} = \frac{\text{Count (video } ID\text{, segment } ID\text{)}}{\text{Count (video } ID\text{)} \times \text{Segment measure (segment } ID\text{)}} \tag{3}$$

In Equation 3, Count (video ID, segment ID) represents a count of the number of unique users assigned to the user segment with a particular segment ID that viewed a video with a particular video ID, Count (video ID) represents a count a total number of unique users that viewed the video with the particular video ID, and Segment measure (segment ID) represents the segment measure for the user segment having the particular segment ID. This way of computing the segment view score brings in the ratio of the number of users in the user segment and the total number of known users.

Similar scores can be computed for video channels using similar equations. For example, the segment view score for a user segment and a video channel can be computed using Equation 4 or 5:

$$\text{Segment view score} = \frac{\text{Count (channel } ID\text{, segment } ID\text{)}}{\text{Count (channel } ID\text{)}} \tag{4}$$

$$\text{Segment view score} = \frac{\text{Count (channel } ID\text{, segment } ID\text{)}}{\text{Count (video } ID\text{)} \times \text{Segment measure (segment } ID\text{)}} \tag{5}$$

In Equations 4 and 5, Count (channel ID, segment ID) represents a count of the number of unique users assigned to the user segment with a particular segment identifier (ID) that viewed a channel with a particular channel ID, and Count (channel ID) represents a count a total number of unique users that viewed the channel with the particular channel ID. The segment measure of Equation 5 can be computed for a user segment having the particular segment ID using Equation 2.

To select the user segments for a video, the collaborative filtering engine 122 can determine a segment view score for each user segment and the video using Equation 1 or 3, or a combination of the two scores (e.g., a product, sum, or average of the two scores. One or both of Equations 1 and 3 can be used depending on the application and/or data available. Equation 1 measures the per segment ID count for a user segment and video, while Equation 3 measures the lift of the user segment for the video relative to all video traffic, and may be more accurate in some applications.

The collaborative filtering engine 122 can then select the user segments for the video using the segment view scores for the user segments. For example, the collaborative filtering engine 122 can select each user segment for which the segment view score satisfies a threshold score or a specified number of the user segments having the highest segment view scores. For example, the collaborative filtering engine can 122 can select the user segments in order from highest to lowest until reaching a specified maximum number of user segments for the video.

The collaborative filtering engine 122 can select user segments for a channel using a similar process. For example, the collaborative filtering engine 122 can determine a segment view score for each user segment and the channel using Equation 4 or 5. The collaborative filtering engine 122 can select each user segment for which the segment view score satisfies a threshold score or a specified number of the user segments having the highest segment view scores.

In some implementations, the collaborative filtering engine 122 can apply some user privacy enhancement conditions to the user segments being assigned to a video or channel. For example, the collaborative filtering engine 122 can apply a k-anonymity condition to each user segment to ensure that there are at least a minimum number of users that have been assigned to the user segment prior to assigning the user segment to a video. Applying this k-anonymity condition ensures that user data for users assigned to a user segment is not leaked or revealed by the video evaluation system 120.

The collaborative filtering engine 122 can provide the set of user segments for each video and/or the set of user segments for each channel to the semantic evaluation engine 124. In general, the semantic evaluation engine 124 evaluates the semantic relevance between each user segment in the set of user segments and the video or channel and filters, from the set of user segments, those that do not have sufficient semantic relevance to the video or channel.

In some implementations, the user segments can be structured hierarchically with broad parent segments and more specific child segments. For example, a highest level segment may be "Media and Entertainment" with some child segments being "Music Lovers," "Movie Lovers," and "Book Lovers." The child segments can also have child segments of their own. For example, the segment "Music Lovers" can have child segments "Country Music Lovers" and "Pop Music Lovers."

The semantic evaluation engine 124 can execute segment rollup logic that assigns higher level segments to videos to which their child or grandchild segments have been assigned. For example, if a video is assigned the "Pop Music Lovers" user segment by the collaborative filtering engine 122, the semantic evaluation engine 124 can also assign, to the video, the "Music Lovers" and "Media and Entertainment" user segments.

The semantic filtering engine 124 can apply a semantic filter to the set of user segments for a video channel to ensure a sufficient level of semantic relevance between the corresponding topic of each user segment and the content of the video or channel. In some implementations, the semantic filtering engine 124 determines a semantic similarity score for each user segment in the set of user segments for a video or channel. The semantic similarity score represents the similarity between the topic of the user segment and the content of the video or channel. The semantic filtering engine 124 can then filter, from the set of user segments, any user segment for which the semantic similarity score does not satisfy a threshold. For example, the semantic filtering engine 124 can compare each semantic similarity score to a threshold score. If the semantic similarity score for a user segment is less than the threshold score, the semantic filtering engine 124 can remove the user segment from the user segments. After filtering, the set of user segments for the video or channel can include only those having a semantic similarity score that satisfies (e.g., meets or exceeds) the threshold score.

The semantic similarity score for a video or channel and a user segment can be determined based on topics or categories assigned to the video or channel and topics or categories assigned to each user segment. The semantic evaluation engine 124 can compute the semantic similarity score based on a cosine similarity between the topics or categories assigned to the video and the topics or categories assigned to the user segment. In other words, the semantic similarity score for a video or channel and a user segment can be based on the similarity between the topics or categories assigned to the video or channel and topics or categories assigned to the user segment. For example, a larger number of matching (or similar) topics shared by the video or channel and the user segment, the higher the semantic similarity score for the video or channel and the user segment.

In some implementations, the semantic evaluation engine 124 (or another component the video evaluation system 120) trains a semantic relevance model based on co-occurrence data for videos. For example, two videos may be considered semantically similar if users that watch one of the videos also watch the other video. The semantic evaluation engine 124 can train a machine learning model (e.g., a neural network, regression model, decision trees, etc.) based on the user data and video data stored in the data storage units 123 and 125. The semantic relevance model can be trained to output a semantic similarity score for a video or channel and a user segment.

The semantic evaluation engine 124 can provide the subset of user segments that remain after the semantic filtering to the quality evaluation engine 126. The quality evaluation engine 126 can evaluate the quality of the user segments and remove, from the subset of user segments remaining after semantic filtering, any user segments for which the quality is insufficient.

The quality evaluation engine 126 can determine one or more quality scores for each user segment with respect to the video or channel. One example quality score is a precision score. The precision metric can be based on user segments assigned to users that view videos. The precision metric can be determined based on user feedback, which can be in the form of surveys provided to a set of users. For example, the survey for a user can request that the user identify if the user is interested in a topic corresponding to a user segment. In a particular example, the survey can ask "are you a food lover?" for a food lovers user segment.

The precision score for a user segment and a video can be based on a number of true positive responses for the user segment and video that has been assigned to the user segment and a total number of false positive survey responses for the user segment and video. For example, the precision score for a user segment and a video can be based on a ratio between a number of true positive responses for the user segment and video that has been assigned to the user segment and a total number of false positive survey responses for the user segment and video. A true positive response for a user segment and video is a view of the video by a surveyed user that indicated in the survey result that the user is a member of the user segment. A false positive response for a user segment and video is a view of the video by a surveyed user that indicated in the survey that the user is not a member of the user segment.

For example, the precision score can be computed using Equation (6):

$$\text{Precision} = \frac{\textit{Num}\text{ true positive responses}}{(\textit{Num}\text{ true positive responses} + \textit{num}\text{ false positive responses})} \tag{6}$$

Another example quality score for a user segment and a video is a combined score that is based on the precision score and a lift score. The lift score for the user segment and video can be based on the precision score for the user segment and the video and a prior score for the user segment independent of the video. The prior score can be based on the number of positive survey responses, the number of negative survey responses, and the number of videos watched by users with positive survey responses and the number of videos watched by users with negative survey responses. For example, the prior score for a user segment can be computed using Equation (7):

$$\text{Prior} = \frac{(PSRs \times \text{Views}_1)}{(PSRs \times \text{Views}_1) + (NSRs \times \text{Views}_2)} \quad (7)$$

In equation (7), PSRs represents the number of positive survey responses for the user segment (e.g., the number of users that indicated that they are members of the user segment or are interested in the topic corresponding to the user segment) during a specified time period, $\text{Views}_1$ represents the number of videos watched by users with a positive survey response (e.g., users that indicated that they are members of the user segment or are interested in the topic corresponding to the user segment) during the specified time period, $\text{Views}_2$ represents the number of videos watched by users with a negative survey response (e.g., users that indicated that they are not members of the user segment or are not interested in the topic corresponding to the user segment) during the specified time period, and NSRs represents the number of negative survey responses for the user segment (e.g., the number of users that indicated that they are not members of the user segment) during the specified time period.

For example, consider the user segment "Food Lovers." Assume there are 5 users that are food lovers that each watched 7 videos and 2 users that are not food lovers that watch 2 videos each. In this example, the PSR is 5 (users that are food lovers), the NSR is 2 (users that are not food lovers), $\text{View}_1$ is 35 (35 total videos watched by the 5 food lovers) and $\text{View}_2$ is 4 (4 total videos watched by the 2 non-food lovers). Thus, the prior score in this example is (5*35)/((5*35)+(2*4))=0.0956.

The prior score represents the overall distribution of the users that watched videos with respect to whether the users are in the user segment or not. The prior score combined with the precision score provides more insight into the relevance of a user segment to a video than using the precision score alone. For example, combining the two scores can indicate the lift of views of the video by users of the user segment, which is referred to as a lift score. The lift score indicates how much more likely it is that a user of the user segment will watch the video compared to all users.

The lift score can be computed using Equation (8):

$$\text{Lift} = \frac{\text{Precision}}{\text{Prior}} \quad (8)$$

In Equation (8), Precision represents the precision score for the user segment and video (e.g., computed using Equation (6)) and prior represents the prior score for the user segment (e.g., computed using Equation 7). In this example, a lift score of 1.0 indicates a neutral response to the video by users of the user segment as a lift score 1.0 indicates that the users watch the video at a rate that matches the distribution of the users that watch videos in general. A lift score that is greater than 1.0 indicates that users in the user segment are more likely to watch the video than the overall view rate of all users, and the higher the lift score, the greater the likelihood that users in the user segment are likely to watch the video. A lift score that is less than 1.0 indicates that users in the user segment are less likely to watch the video than all users, and the lower the lift score, the lower the likelihood that the users in the user segment are likely to watch the video.

The quality evaluation engine 126 can compute the combined score as the product of the precision score and the lift score. The quality evaluation engine 126 can compare each quality score (e.g., precision score and/or combined score) for a user segment to a respective threshold. In some implementations, the user segment has to pass both quality checks to be assigned to the video. For example, the precision score may have to satisfy (e.g., meet or exceed) a first threshold and the combined score may have to satisfy (e.g., meet or exceed) a second threshold for the user segment to be assigned to the video. In another example, the user segment may only have to pass one of the quality checks or only one of the quality checks may be used to check for quality.

The quality evaluation engine 126 can filter, from the subset of user segments received from the semantic evaluation engine 124, each user segment that does not pass the quality check(s). The quality evaluation engine 126 can generate a filtered set of user segments for the video or channel. This filtered set of user segments can include those that were included in the original set by the collaborative filtering engine 122 and that were not filtered by either the semantic evaluation engine 124 or the quality evaluation engine 126. In other words, the filtered set of user segments are those that passed both the semantic relevance evaluation and the quality evaluation.

The interest-based user segment expansion engine 128 performs a semantic expansion of the filtered set of user segments received from the quality evaluation engine to form a final set of user segments 127 that includes the user segments received from the quality evaluation engine 126. The interest-based user segment expansion engine 128 can add, to the filtered set of user segments 127, zero or more user segments for which their corresponding topic is determined to be semantically similar to the video (e.g., to content and/or topics of the video).

In some implementations, the interest-based user segment expansion engine 128 can be configured to determine a semantic similarity score between the video and each of multiple user segments. Similar to the semantic similarity score described above, this semantic similarity score can be determined based on topics or categories assigned to the video or channel and topics or categories assigned to each user segment. The interest-based user segment expansion engine 128 can determine the semantic similarity score for a video and a user segment based on distances between embeddings of the topics or categories of the video and embeddings of the topics or categories of the user segment, e.g., using Euclidean distance, cosine distance (e.g., the cosine of the angle between the embedding vectors), dot product distance (the cosine of the angle between the embedding vectors multiplied by lengths of the vectors), etc. The semantic expansion is described in further detail below with reference to FIG. 2.

The video evaluation system 120 can be configured to tune the thresholds used to select and/or filter the user segments for a video or channel. For example, the video evaluation system 120 can be configured to calibrate the threshold scores such that at least a specified number of user segments can satisfy the thresholds and be assigned to each video.

In another example, the video evaluation system 120 can be configured to tune thresholds used to determine whether an unknown user is a member of a user segment based on a video that the user is viewing. For example, the digital component selection system 134 can be configured to determine a likelihood that a user of a client device 110 from which a digital component request is received is a member of each of one or more user segments. The digital component selection system 134 can determine this likelihood based on the user segments assigned to the video, e.g., using a trained machine learning model that is trained to output a likelihood score based on the user segments assigned to the video and contextual signals of digital component requests (e.g., coarse geographic location, device type, etc.). When a digital component request related to a view of a video is received by the digital component selection system 134, the digital component selection system 134 can provide the user segments assigned to the video (and/or their corresponding topics) and/or the contextual signals of the digital component request as inputs to the machine learning model and receive, as outputs of the machine learning model, a likelihood score for each of one or more user segments. The digital component selection system 134 can then compare the likelihood score for each user segment to a respective threshold for the user segment. If the likelihood score satisfies the threshold (e.g., by meeting or exceeding the threshold), the user can be considered a member of the user segment. The video evaluation system 120 can be configured to adjust these thresholds for the user segments to improve the quality of the prediction results.

The video evaluation system 120 can send, to the content platform 130, the final set of user segments 127 for each video and/or channel. The digital component selection system 134 can use the final set of user segments assigned to a video or channel to distribute digital components to client devices 110 for display with the video or channel, as described herein.

The content platform 130 can then select one or more digital components based on the final set of user segments 127. For example, the content platform 130 can select the one or more digital components based at least in part on the topics corresponding to the expanded set of user segments. In some implementations, the content platform 130 can further evaluate contextual data included in the digital component request. For example, the content platform 130 can select one or more digital components to display with a video being viewed by a user based on the video itself. In a particular example, the content platform 130 can select a digital component based on the topic of the video, a topic of the channel that includes the video, and/or other appropriate information. By providing information that enables the content platform 130 to select digital components that are predicted to be relevant to the user of the client device 110, including the final set of user segments 127, the video evaluation system 120 improves the efficiency of resource use (at the client device, the server and the underlying network infrastructure) by limiting the need to retransmit and reload content at the client device 110.

The content platform 130 can also be configured to select a digital component for a video using the final set of user segments 127 based on user segments assigned to the video and/or user segments assigned to a channel (or other video group) that includes the video. In general, a user segment can include a group or audience of users that have been determined to be interested in a particular topic. As described above, each user segment can have a corresponding topic and the users assigned to a user segment can be users that are determined to be interested in the topic. Example topics can include topics of interest (e.g., cats, books, travel, etc.) or brands that represent short term interests of users, such as items that the user has viewed or searched for recently, etc. The content platform 130 can provide the selected digital component to the client device 110, e.g., over the network 105.

Figure 2:
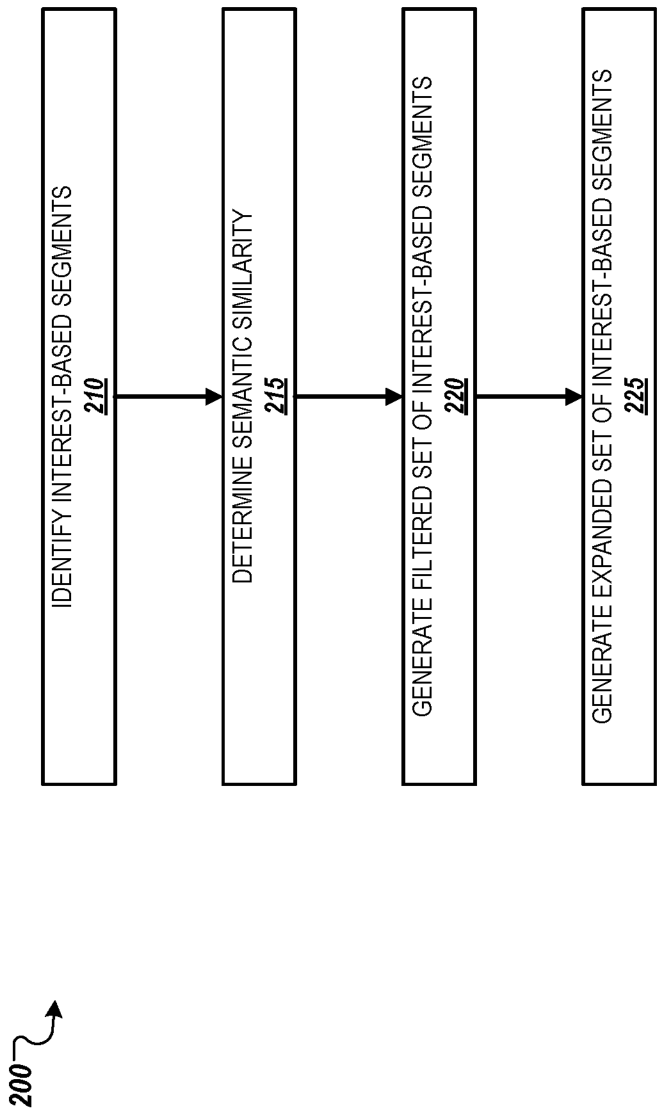
FIG. 2 is a flow diagram of an example process for assigning user segments to a video.

FIG. 2 is a flow diagram of an example process 200 for assigning user segments to a video. For convenience, the process 200 will be described as being performed by systems for assignment of user segments and selection of digital components, e.g., the video evaluation system 120 of FIG. 1, appropriately programmed to perform the process 200. Operations of the process 200 can also be implemented as instructions stored on one or more computer readable media, which may be non-transitory, and execution of the instructions by one or more data processing apparatus can cause the one or more data processing apparatus to perform the operations of the process 200. One or more other components described herein can perform the operations of the process 200.

The system can identify (210) a set of user segments for a video based on user segments assigned to a set of users that previously watched the video and, for each user segment, a measure of users in the set of users that have been assigned the user segment. The video evaluation system 120 can identify the set of user segments for the video using collaborative filtering (e.g., as performed by the collaborative filtering engine 122 of FIG. 1), as described above.

The system can determine (215), for each user segment, a level of semantic similarity between the corresponding topic for the user segment and content of the video. The video evaluation system 120 can identify the set of user segments and/or filter the set of user segments for the video using semantic evaluation (e.g., performed by the semantic evaluation 124 of FIG. 1), as described above.

The system can generate (220) a filtered set of user segments for the video by filtering, from the set of user segments, one or more user segments based on the level of semantic similarity for each user segment. The semantic similarity score for a user segment with respect to the video can represent a measure of semantic similarity between the video and the corresponding topic of the user segment.

The system can determine one or more quality scores for each user segment. For example, the quality evaluation engine 126 can determine, as quality scores, a precision score and/or a combined score for each user segment using Equations 6-8 above.

The system can select one or more user segments for the video based on the score. In some implementations, the video evaluation system 120 can compare each score for each user segment to a threshold. The video evaluation system 120 can then select, for the video, the user segments for which each score (or at least one score) satisfies (e.g., meets or exceeds) its threshold.

In another example, the video evaluation system 120 can combine the scores (e.g., by determining a product of the scores or normalizing the scores and determining a sum or measure of central tendency of the normalized scores for each user segment) and select the user segments having the highest combined scores.

In another example, the video evaluation system 120 can select a set of user segments based on the segment view scores for the user segments. For example, the video evaluation system 120 can select a specified number of user segments having the highest segment view scores or each user segment having a segment view score that satisfies a threshold score.

The video evaluation system 120 can then filter, from the set of user segments, each user segment for which the semantic similarity score or a quality score fails to satisfy a respective threshold. The video evaluation system 120 can then assign, to the video, a proper subset (e.g., at least one but fewer than the entire set) of the original set of user segments that remain after the filtering.

The system can generate (225) an expanded set of user segments for the video by adding one or more additional user segments based on respective levels of semantic similarity between the additional user segments and the video, e.g., the content of the video. This can be used to expand the coverage of topics assigned to each or at least some videos. The video evaluation system 120 can identify an expanded set of user segments for the video using user segment expansion (e.g., as performed by the interest-based segment expansion engine 128 of FIG. 1), as described above. For example, the system can compare the embeddings assigned to the video, and a second set of embeddings, such as the embeddings for user segments not assigned to the video. The system can perform the comparison using various techniques including determining the Euclidean distance, the cosine distance, other appropriate distance measures, and combinations of distance measures. The output of such comparison is a semantic similarity score for the additional user segment and the video. If the system determines that an additional user segment is similar to the video based on the comparison of the embeddings for the additional user segment and the video (e.g., based on the semantic similarity score satisfying a threshold), the system can add the additional user segment to the set of user segments of the video, thereby creating an expanded set of user segments.

In some implementations, the system normalizes this semantic similarity score for each user segment relative to those computed during the collaborative filtering and semantic filtering stages. To normalize the comparison, the semantic score for the expanded set of interests can be scaled according to Equation (9):

$$\text{Semantic Score}' = \frac{(\text{Semantic Score} - \text{Semantic High}) * (\text{Collaborative High} - \text{Collaborative Low})}{(\text{Semantic High} - \text{Semantic Score Low})} - \text{Collaborative Low} \tag{9}$$

The components of Equation (9) can be defined as: Semantic Score as the semantic similarity score computed at this user segment expansion stage; Semantic High as the highest possible semantic similarity score that can be computed during the user segment expansion stage; Semantic Low as the lowest possible semantic similarity score that can be computed for a user segment during the user segment expansion stage; Collaborative High as the highest possible score that can be computed for a user segment during the collaborative filtering and semantic filtering stages; and Collaborative Low as the lowest possible score that can be computed for a user segment during the collaborative filtering and semantic filtering stages.

In some implementations, the system can assign a user segment to a video if the semantic similarity between the video and the user segment satisfies a configured threshold. For example, if the embedding of the video and the embedding of the user segment is within a configured amount, the system can determine that semantic similarity satisfies a configured threshold. In a particular example, the system can assign a user segment to a video if the semantic similarity score or normalized semantic similarity score satisfies a configured threshold. Note that this threshold can be the same as the threshold used for semantic filtering, or larger or smaller than the threshold used for semantic filtering.

In some implementations, the system can apply up to a number of user segments to the video. For example, if the system only assigns up to a fixed number N (e.g., 10, 20, 25, 50, etc.) of user segments to a video, and collaborative filtering engine has assigned a number M that is smaller than N, the system can assign as part of expansion up to N-M user segments. The system can select, for this example, the user segments that are closest in semantic similarity to the embedding of the video, e.g., by having the highest semantic similarity scores among those for which scores were computed at this expansion stage. In such implementations, if M at least equals N, then no additional user segments are assigned.

In some implementations, the system can apply user segments of a video channel that includes the video to the expanded set of user segments of the video. For example, the system can apply all user segments of the video channel to the video. In another example, the system can apply up to a configured number of user segments from the video channel to the video, such as the embeddings that are closest.

In some implementations, the system can assign, for each video or channel, a priority to each user segment assigned to the video or channel, or to a subset of user segments assigned to the video or channel. The system can use the priority when distributing digital components to client devices for display with the video, e.g., when selecting a digital component to distribute to the client devices. For example, the system can assign a priority of each of the one or more user segments assigned to a video channel that is lower than each other user segment in the expanded set of user segments. That is, for a given video, the priority of user segments assigned directly to the video may be higher than the priority of user segments assigned to a channel that includes the video. In an alternate example, the system can assign a priority of each of the one or more user segments assigned to a video channel that is higher than each other user segment in the expanded set of user segments.

In another example, the system can assign a higher priority to each of the one or more user segments assigned by collaborative filtering (e.g., by the collaborative filtering engine 122, the semantic evaluation engine 124 and the quality evaluation engine 126 of FIG. 1) as compared to priority assigned during expansion (e.g., by the user segment expansion engine 128 of FIG. 1). For example, a user segment added to the set of user segments during the expansion stage to generate the expanded set of user segments for the video may have a lower priority than those that remained after the semantic filtering stages. In an alternate example, the system can assign a lower priority to each of the one or more user segments assigned by collaborative filtering as compared to priority assigned during the expansion. In still another example, the system can assign priorities based on the distance metric between embeddings, as described above, e.g., assigning higher priority if the embeddings are determined to be more similar. The priority for each user segment can be represented as a score (e.g., 0-10, 1-100, or another appropriate range) or a ranking from highest to lowest priority.

The system can then select digital components for distribution to the client devices based at least in part on the priority assigned to each user segment. For example, assume that a first user segment and a second user segment are assigned to a video. If the first user segment has a higher priority than the second user segment, digital components that are associated with a topic that matches the topic of the first segment can be selected for display with the video over digital components associated with a topic that matches the topic of the second user segment.

In another example, the system can generate a score for each candidate digital component in a set of candidate digital components that are being considered for display with the video. This score for a digital component can be based on a degree of match between a topic associated with the digital component (e.g., a topic for which the digital component is eligible for distribution) and a user segment assigned to the video, a priority for the user segment, a predicted performance of the digital component (e.g., a predicted likelihood that a user will interact with the digital component), and/or a selection parameter indicating an amount that a provider of the digital component is willing to provide to a publisher of the video for display of the digital component with the video.

Figure 3:
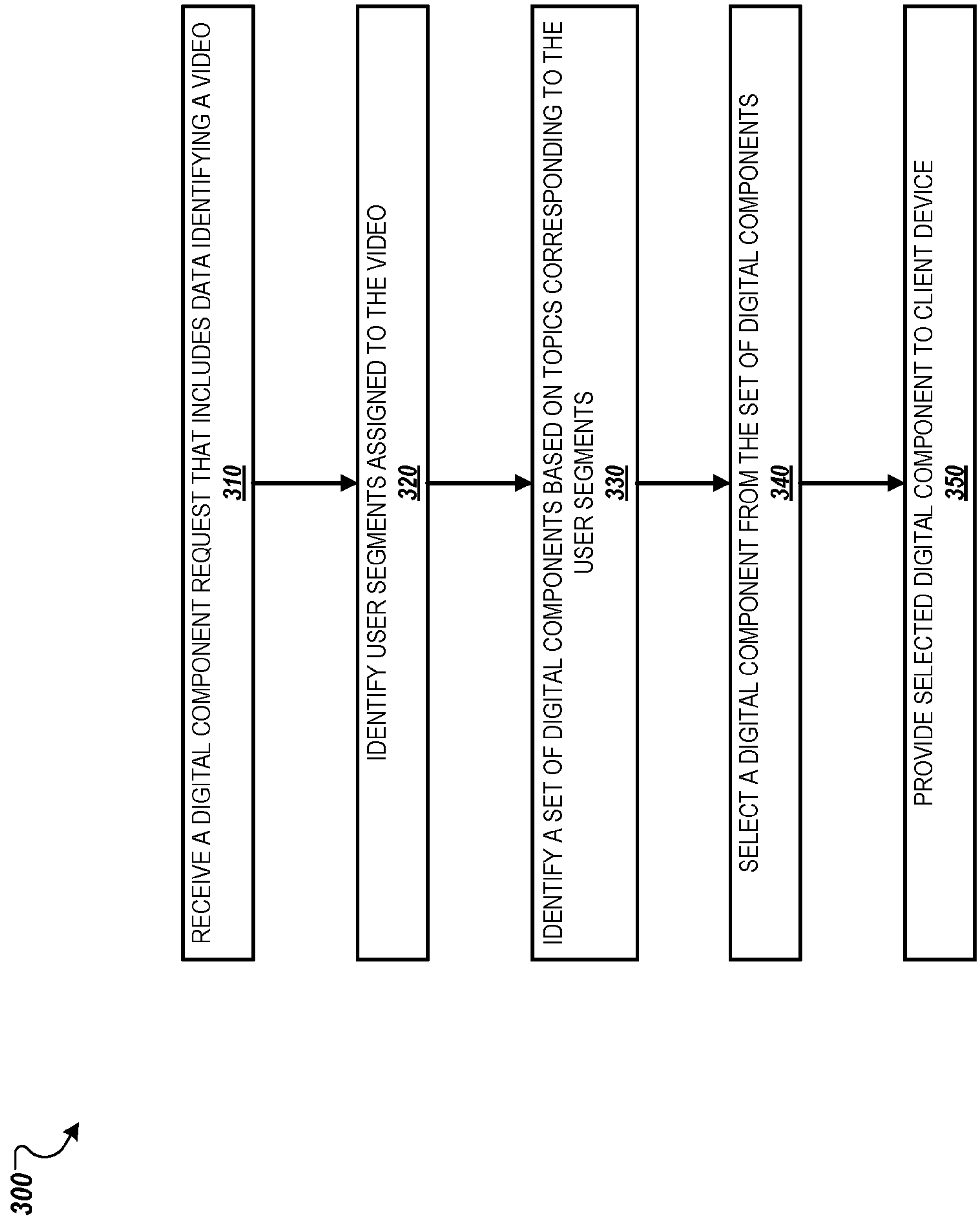
FIG. 3 is a flow diagram of an example process for selecting a digital component for display at a client device with a video.

FIG. 3 is a flow diagram of an example process 300 for selecting a digital component for display at a client device with a video. Operations of the process 300 can be performed by a digital component selection system, e.g., the digital component selection system 130 of FIG. 1. Operations of the process 300 can also be implemented as instructions stored on one or more computer readable media, which may be non-transitory, and execution of the instructions by one or more data processing apparatus can cause the one or more data processing apparatus to perform the operations of the process 300.

The system receives (310) a digital component request is received. For example, the digital component selection system 134 can receive a digital component request from a client device 110. The digital component request can identify a video that is being or is about to be displayed by an application 112 running on the client device 110.

The system identifies (320) user segments assigned to the video. As described above, a set of user segments can be selected for and assigned to the video by the video evaluation system 120. The digital component selection system 134 can identify the user segments and their corresponding topics.

The system identifies (330) a set of digital components based on the topics corresponding to the user segments assigned to the video. As described above, digital components can have distribution criteria that identifies topics for which the digital components are eligible and/or topics for which the digital components are not eligible. The digital component selection system 134 can compare the topics of the user segments assigned to the video to the topics of the distribution criteria for the digital components to identify a set of eligible digital components that are eligible to be provided to the client device 110 in response to the digital component request.

The system selects (340) a digital component from the set of digital components based at least in part on the topics corresponding to the final set of user segments. (As described above, user segments can include a topic.) The digital component selection system 134 can determine a score for each candidate digital component based on various factors such as selection parameters for the eligible digital components, predicted performance measurements for each digital component, and/or other appropriate information. The system can then select a digital component based on the score. As described above, the system can also evaluate a priority assigned to user segments. For example, if the system determines that two digital components are equally appropriate (e.g., the scores are within a configured threshold), the system can select the digital component with the highest priority. In another example, the system can consider as eligible digital components only those that have been assigned user segments with a priority that satisfies a threshold.

The system provides (350) the selected digital component to the client device 110 from which the digital component request was received. For example, the digital component selection system 134 can send the digital component or a resource locator for the digital component to the client device 110. The client device 110 can use the resource locator, if appropriate, to download the digital component from a network computer to display to the user of the client device 110.

Figure 4:
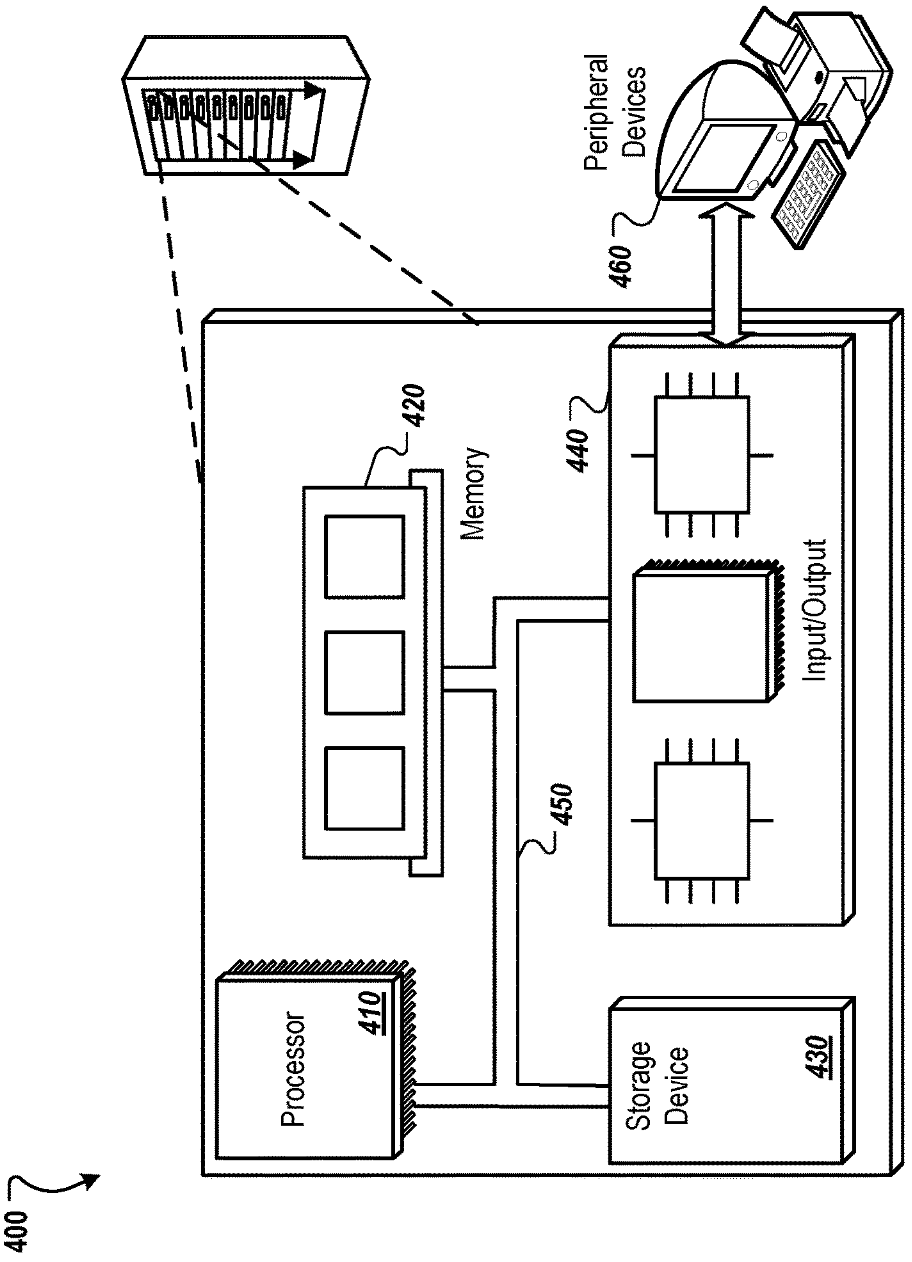
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

identifying, for a video, a set of user segments to which users in a set of users that previously watched the video have been assigned and, for each user segment in the set of user segments, a number of users in the set of users that have been assigned to the user segment, wherein each user segment represents a group of users determined to be interested in a corresponding topic;

determining, for each user segment in the set of user segments, a level of semantic similarity between the corresponding topic for the user segment and content of the video;

generating a filtered set of user segments for the video by filtering, from the set of user segments, one or more user segments based on the level of semantic similarity for each user segment;

generating an expanded set of user segments for the video by adding one or more additional user segments to the filtered set of user segments based on respective levels of semantic similarity between the additional user segments and the content of the video; and distributing digital components to client devices for display with the video based at least in part on the topics corresponding to the expanded set of user segments.

2. The computer-implemented method of claim 1, wherein identifying the set of user segments for a video comprises applying collaborative filtering to topics of interest of the set of users and topics of interest of the set of similar users to identify the corresponding topics of the set of user segments.

3. The method of claim 1, wherein filtering, from the set of user segments, one or more user segments based on the level of semantic similarity for each user segment comprises:

comparing, for each user segment, the level of semantic similarity for the user segment to a threshold; and filtering, from the set of user segments, each user segment for which the level of semantic similarity is less than a threshold.

4. The method of claim 1, further comprising:

determining that a number of user segments in the expanded set of user segments is less than a threshold;

in response to determining that the number of user segments in the expanded set of user segments is less than a threshold, identifying one or more user segments assigned to a video channel that includes the video; and adding at least one of the one or more user segments assigned to a video channel that includes the video to the expanded set of user segments.

5. The method of claim 4, further comprising assigning a priority to each user segment, wherein distributing digital components to client devices for display with the video based at least in part on the topics corresponding to the expanded set of user segments comprises selecting digital components for distribution to the client devices based on the priority assigned to each user group.

6. The method of claim 5, wherein the priority of each of the one or more user segments assigned to a video channel is lower than each other user segment in the expanded set of user segments.

7. The method of claim 1, wherein generating the filtered set of user segments for the video comprises filtering, from the set of user segments, one or more user segments based on one or more quality metrics assigned to each user segment.

8. The method of claim 7, wherein the one or more quality metrics comprise at least one of lift or precision.

9. A system comprising one or more computers and one or more storage devices storing instructions that when executed by the one or more computers cause the one or more computers to perform operations comprising:

identifying, for a video, a set of user segments to which users in a set of users that previously watched the video have been assigned and, for each user segment in the set of user segments, a number of users in the set of users that have been assigned to the user segment, wherein each user segment represents a group of users determined to be interested in a corresponding topic;

determining, for each user segment in the set of user segments, a level of semantic similarity between the corresponding topic for the user segment and content of the video;

generating a filtered set of user segments for the video by filtering, from the set of user segments, one or more user segments based on the level of semantic similarity for each user segment;

generating an expanded set of user segments for the video by adding one or more additional user segments to the filtered set of user segments based on respective levels of semantic similarity between the additional user segments and the content of the video; and distributing digital components to client devices for display with the video based at least in part on the topics corresponding to the expanded set of user segments.

10. The system of claim 9, wherein identifying the set of user segments for a video comprises applying collaborative filtering to topics of interest of the set of users and topics of interest of the set of similar users to identify the corresponding topics of the set of user segments.

11. The system of claim 9, wherein filtering, from the set of user segments, one or more user segments based on the level of semantic similarity for each user segment comprises:

comparing, for each user segment, the level of semantic similarity for the user segment to a threshold; and filtering, from the set of user segments, each user segment for which the level of semantic similarity is less than a threshold.

12. The system of claim 9, wherein the operations comprise:

determining that a number of user segments in the expanded set of user segments is less than a threshold;

in response to determining that the number of user segments in the expanded set of user segments is less than a threshold, identifying one or more user segments assigned to a video channel that includes the video; and adding at least one of the one or more user segments assigned to a video channel that includes the video to the expanded set of user segments.

13. The system of claim 12, wherein the operations comprise assigning a priority to each user segment, wherein distributing digital components to client devices for display with the video based at least in part on the topics corresponding to the expanded set of user segments comprises selecting digital components for distribution to the client devices based on the priority assigned to each user group.

14. The system of claim 13, wherein the priority of each of the one or more user segments assigned to a video channel is lower than each other user segment in the expanded set of user segments.

15. The system of claim 9, wherein generating the filtered set of user segments for the video comprises filtering, from the set of user segments, one or more user segments based on one or more quality metrics assigned to each user segment.

16. The system of claim 15, wherein the one or more quality metrics comprise at least one of lift or precision.

17. One or more non-transitory computer-readable storage media storing instructions that when executed by one or more computers cause the one or more computers to perform operations comprising:

identifying, for a video, a set of user segments to which users in a set of users that previously watched the video have been assigned and, for each user segment in the set of user segments, a number of users in the set of users that have been assigned to the user segment, wherein each user segment represents a group of users determined to be interested in a corresponding topic;

determining, for each user segment in the set of user segments, a level of semantic similarity between the corresponding topic for the user segment and content of the video;

generating a filtered set of user segments for the video by filtering, from the set of user segments, one or more user segments based on the level of semantic similarity for each user segment;

generating an expanded set of user segments for the video by adding one or more additional user segments to the filtered set of user segments based on respective levels of semantic similarity between the additional user segments and the content of the video; and distributing digital components to client devices for display with the video based at least in part on the topics corresponding to the expanded set of user segments.

18. The one or more non-transitory computer-readable storage media of claim 17, wherein identifying the set of user segments for a video comprises applying collaborative filtering to topics of interest of the set of users and topics of interest of the set of similar users to identify the corresponding topics of the set of user segments.

19. The one or more non-transitory computer-readable storage media of claim 17, wherein filtering, from the set of user segments, one or more user segments based on the level of semantic similarity for each user segment comprises:

comparing, for each user segment, the level of semantic similarity for the user segment to a threshold; and filtering, from the set of user segments, each user segment for which the level of semantic similarity is less than a threshold.

20. The one or more non-transitory computer-readable storage media of claim 17, wherein the operations comprise:

determining that a number of user segments in the expanded set of user segments is less than a threshold;

in response to determining that the number of user segments in the expanded set of user segments is less than a threshold, identifying one or more user segments assigned to a video channel that includes the video; and adding at least one of the one or more user segments assigned to a video channel that includes the video to the expanded set of user segments.

* * * * *